United States Patent [19]
Bailey

[11] Patent Number: 5,856,042
[45] Date of Patent: *Jan. 5, 1999

[54] ELECTROCHEMICAL CELLS USING A POLYMER ELECTROLYTE

[75] Inventor: John C. Bailey, Columbia Station, Ohio

[73] Assignee: Eveready Battery Company, Inc., St. Louis, Mo.

[*] Notice: The term of this patent shall not extend beyond the expiration date of Pat. No. 5,409,786.

[21] Appl. No.: 892,284

[22] Filed: Jul. 14, 1997

Related U.S. Application Data

[63] Continuation of Ser. No. 400,899, Mar. 8, 1995, Pat. No. 5,660,950, which is a continuation of Ser. No. 12,689, Feb. 5, 1993, Pat. No. 5,409,786, and a continuation-in-part of Ser. No. 400,898, Mar. 8, 1995, Pat. No. 5,516,339.

[51] Int. Cl.⁶ .............................. H01M 4/02; H01M 4/48; H01M 4/50; H01M 6/00

[52] U.S. Cl. .......................... 429/209; 429/192; 429/194; 429/199; 429/212; 429/217; 429/218; 429/221; 29/623.1; 252/518; 252/519; 252/520

[58] Field of Search .............................. 29/623.1, 623.5; 204/242, 252, 282, 283, 291, 296; 429/122, 217, 192, 188, 194, 199, 221, 224, 52, 50, 209, 212; 252/520, 519, 518

[56] References Cited

U.S. PATENT DOCUMENTS

| | | | |
|---|---|---|---|
| 5,238,758 | 8/1993 | Lee et al. | 429/191 |
| 5,296,318 | 3/1994 | Gozdz et al. | 429/192 |
| 5,418,091 | 5/1995 | Gozdz et al. | 429/252 |

*Primary Examiner*—Kathryn Gorgos
*Attorney, Agent, or Firm*—Robert W. Welsh

[57] ABSTRACT

A cathode is comprised of a major amount of active cathode material and a binding amount of an ionically nonconductive prepolymeric composition. Polymer electrolyte electrochemical cells can be made using these cathodes.

33 Claims, No Drawings

ELECTROCHEMICAL CELLS USING A POLYMER ELECTROLYTE

RELATED APPLICATIONS

This application is a continuation of application Ser. No. 08/400,899, filed Mar. 8, 1995, entitled IONICALLY NON-CONDUCTIVE FINISHED CATHODE FOR ELECTROCHEMICAL CELLS USING A POLYMER ELECTROLYTE, now U.S. Pat. No. 5,660,950 which is a continuation of application Ser. No. 08/012,689, filed Feb. 5, 1993, entitled AN INACTIVE ELECTROCHEMICAL CELL HAVING AN IONICALLY NONCONDUCTIVE POLYMERIC COMPOSITION ACTIVATED BY ELECTROLYTE SALT SOLUTION (As Amended), now U.S. Pat. No. 5,409,786; and a continuation-in-part of application Ser. No. 08/400,898, filed Mar. 8, 1995, entitled A PROCESS FOR MAKING ELECTROCHEMICAL CELLS USING A POLYMER ELECTROLYTE, now U.S. Pat. No. 5,516,339.

FIELD OF THE INVENTION

This invention relates to electrochemical cells that use a polymer electrolyte and to processes for making such cells.

BACKGROUND OF THE INVENTION

Polymer electrolytes are useful in electrochemical cells because such solid or semi-solid electrolytes can eliminate the need for microporous separators, and the resultant cell is free of liquid electrolyte. Microporous separators are used in conventional liquid organic electrolyte cells, and are an expensive component of the cell. Also, these separators can increase the internal resistance of the cell and consequently, may decrease the high rate performance of the cell.

The liquid organic electrolytes used in conventional cells are often highly volatile liquids. If these liquids escape from the cell, a hazardous situation can occur.

Typical polymer electrolytes are comprised of a polymer matrix material and an ionically conductive salt. Examples of polymer matrix materials include the polyalkylene oxides, such as polyethylene oxide, polypropylene oxide, substituted polyethylene glycols, and the like. Examples of the ionically conductive salts include $LiCF_3SO_3$, and $LiClO_4$.

There are several examples of solid polymeric electrolyte cells. U.S. Pat. No. 4,925,751, issued May 15, 1990 to Shackle et al. discloses a solid state laminar cell comprised of an alkali metal anode, a solid ionically conducting electrolyte, a composite cathode and a carrier. The composite cathode is comprised of active material, a conductive filler, and an ionically conductive electrolyte which is comprised of a liquid monomeric or prepolymeric curable composition and an ionizable alkali metal salt. The cathode mixture is applied to a current collector and then a layer of polymer electrolyte is coated over this mixture. The polymer electrolyte layer and the polymer in the cathode are cured in place and a thin foil anode layer is then applied on the polymeric surface. U.S. Pat. No. 4,748,542, issued May 31, 1988 and U.S. Pat. No. 4,638,407, issued Jan. 20, 1987, both to Lundsgaard, disclose solid state capacitors and multicell batteries in which a layer of the solid polymer electrolyte is laminated to a layer of the cathode and anode.

Another example of solid electrolyte cells is disclosed in U.S. Pat. No. 4,594,299, issued Jun. 10, 1986 to Cook et al. The cell is made by protecting an electrode, such as lithium, with an ionically conductive polymer. This electrode can then be combined with a cathode to form the electrochemical cell.

Also, U.S. Pat. No. 4,654,279, issued Mar. 31, 1987 to Bauer et al. discloses a solid polymeric electrolyte which is a two phase interpenetrating network of a mechanically supporting phase of a continuous network of a crosslinked polymer and an ionically conducting phase. A suitable amount of a metal salt is added to the electrolyte to provide ionic conductivity.

In U.S. Pat. No. 4,589,197, issued May 20, 1986, to North, a composite cathode sheet is formed from a solution of active cathode material and a low molecular weight polymer, such as polyethylene oxide, in a solvent such as acetonitrile. The polymer preferably contains an electrolyte salt.

Despite their advantages, there are certain problems associated with the use of solid polymer electrolytes. Three common problems are low volume of active cathode material, mechanical stability of the electrolyte and safety problems associated with assembling live high area cells without the ability to check for shorts. For example, the cells described in U.S. Pat. Nos. 4,925,751, 4,748,542 and 4,638,407 will exhibit each of these problems. The cathode mixture is comprised of the prepolymer and the ionizable salt. Therefore, this mixture will not have as high a volume of active cathode material. The polymer electrolyte layer also contains the ionizable salt, and when it is applied as a film to the cathode mixture, it will be in the form of a tacky viscous gel. Thus, it will be difficult to work with and susceptible to puncture by any of the other cell components, such as the metallic current collector. It is also ionically conductive, and so, when the cathode and electrolyte layer combination is assembled with the anode, the assembly is an active electrochemical cell. In U.S. Pat. No. 4,589,197, the choice of polymers is practically limited to low molecular weight polymers since the polymer is dissolved in a solvent and cast to form a sheet.

Considering these problems, new polymer electrolyte cells and processes for making them are desired.

SUMMARY OF THE INVENTION

This invention is an article suitable for use as a cathode in an electrochemical cell. It is comprised of a major amount of active cathode material, and a binding amount of an ionically nonconductive prepolymeric composition.

In another aspect, this invention is a cathode for use in an electrochemical cell. It comprises a major amount by volume of active cathode material dispersed in an ionically nonconductive polymer film. The film is in contact with an electrically conductive current collector.

In yet another aspect, this invention is an electrochemical cell comprised of an alkali metal or alkaline earth metal anode, the above described cathode and an ionizable electrolyte salt.

In another aspect, this invention is a process for making an electrochemical cell that contains a polymer electrolyte. The process comprises preparing a cathode by contacting a major amount by volume of active cathode material with a binding amount of an ionically nonconductive prepolymeric composition. The active cathode and prepolymer composition are applied to an electrically conductive current collector, and the prepolymeric composition is polymerized to form a film with the active cathode material dispersed throughout. An active anode material is placed next to the cathode and an electrically insulating material is disposed between the cathode and anode to form an electrode assembly. The electrode assembly is placed inside a housing for the cell, and an amount of an ionizable electrolyte salt solution sufficient to provide ionic conductivity to the polymer film in the cathode and between the cathode and anode is added to complete the cell.

The electrochemical cells of this invention can be aqueous or nonaqueous, and primary or rechargeable and have a solid polymer electrolyte. The electrolyte is formed after the prepolymer composition in the cathode is polymerized and the electrode assembly is made and placed in the cell; at which point, the ionizable salt is added. Since the ionizable salt is not added until after the electrode assembly is completed, if any short is present, no current will flow, and any potentially hazardous situations are avoided.

Another advantage of this invention is that since the salt is not added until after the assembly is completed, the cathode can contain a large volume of active cathode material. The cathodes of this invention have at least 50% by volume of active cathode material in the finished cathode.

Yet another advantage of this invention is that after the prepolymeric composition is polymerized, the cathode is in the form of a solid dry flexible film that can be easily assembled with the anode.

Still yet another advantage of the cells of this invention is that when the salt is added as a solution in a solvent which serves as a plasticizer for the polymer, the polymer composition in the cathode mixture will swell to provide good electrode and electrolyte interfacial contact.

DETAILED DESCRIPTION OF THE INVENTION

The active cathode materials useful for this invention include the transition metal chalcogenides. Examples include transition metal oxides and sulfides, such as CuS, CuO, iron sulfides, $V_2O_5$, $V_6O_{13}$, cobalt oxides, $TiS_2$, $WO_3$, $MoO_3$, $MoS_2$, transition metal polysulfides, lithiated metal oxides and sulfides such as lithiated cobalt and/or nickel oxides, lithiated manganese oxides, $Li_xTiS_2$, $Li_xFeS_2$ and the like. Electrically conductive polymers such as polypyrrole or polyaniline may also be used. Preferred active cathode materials include $FeS_2$, $MnO_2$, $TiS_2$, $V_2O_5$, $V_6O_{13}$, $WO_3$ and the like. The most preferred active material will depend on the type of anode employed and on the intended use of the cell. For example, with a lithium anode and a 1.5 volt cell, the $FeS_2$ cathode material is most preferred.

The prepolymeric compositions useful in this invention are electrically insulating and ionically nonconductive. By "ionically nonconductive" is is meant that the compositions are substantially nonconductive; i.e. they are not sufficiently conductive to produce a live cell. By "prepolymeric" it is meant that the composition can be polymerized. The composition, thus, can be polymerizable monomers, comonomers, oligomers or mixtures of these. The composition can also be curable and crosslinkable. The composition can be polymerized, cured or crosslinked by the use of radiation or heat. A polymerization initiator can be present. Although the composition is ionically nonconductive when mixed, polymerized, cured and crosslinked in the presence of the active cathode material, it can be rendered ionically conductive by absorbing an ionizable electrolyte salt, preferably, from a solution of the salt in an organic solvent. Suitable compositions include ethylenically unsaturated monomers, comonomers and oligomers, alkylene oxide monomers, comonomers and oligomers, acrylic acid-based monomers, comonomers and oligomers, and mixtures of such compounds. Specific examples include ethylenically unsaturated monomers, comonomers or oligomers, such as polypropylene oxide, polyethylene oxide, polyethylene-polypropylene oxide, polyethylene glycol and mixtures thereof. Polyethylene glycol acrylates, diacrylates and triacrylates, modified siloxanes, urethanes with polyethylene glycol side chains, epoxides, acrylated epoxies and the like can also be used. Mixtures of low molecular weight polyethylene oxide and one or more polyethylene glycol acrylates, e.g. diacrylates and triacrylates are preferred.

Also, any of the conductive polymer electrolytes disclosed in U.S. Pat. Nos. 4,638,407; 4,925,751; 5,011,501; and 5,041,346, all hereby incorporated by reference, can be used as the cathode polymer film of this invention as long as the resultant polymer film is substantially ionically nonconductive, such as is produced by omitting the ionizable electrolyte salt during preparation of the cathode polymer film.

A polymerization initiator can be included with the prepolymeric composition. The choice of initiator will depend on the types of monomers or prepolymers used in the composition. Examples of suitable polymerization initiators are disclosed in *Encyclopedia of Polymer Science and Engineering*, Vol. 2, "Anionic Polymerization and Cationic Polymerization," pp. 143 to 145, herein incorporated by reference. A preferred example is 2,2'-azobisisobutyronitrile.

The cathode mixture can include other components, such as electronic conductors, voltage regulators, such as reducible metal additives, and the like. Preferred electronic conductors include graphite, acetylene black, carbon fibers, compatible metal powders or fibers, or electrically conductive polymers, such as polypyrrole, polyaniline and the like.

The active cathode material makes up the major portion of the cathode mixture by volume. Typically, when measured in the absence of the ionizable electrolyte salt, the amount of the active cathode material in the finished cathode is at least about 50%, preferably at least about 60%, and more preferably at least about 70% by volume. The amount of the prepolymeric composition used is an amount sufficient to bind the active cathode material and to form a polymer film having the active cathode material dispersed throughout. This amount can vary, but typically ranges from about 10% to about 45% by volume, and preferably, from about 20% to about 35% by volume.

The cathodes of this invention are made by contacting the active cathode material with a binding or film-forming amount of the prepolymeric composition. An organic solvent or plasticizer can be employed to improve the viscosity of the mixture. If the solvent will not fill the plasticizer function, then low boiling point solvents are desired, such as trichloroethylene, dimethoxyethane, triglyme, dioxolane, and tetrahydrofuran. A minor amount of the solvent is employed so that it can be removed easily after applying the cathode mixture to the current collector. If the solvent will function as a plasticizer for the polymer, then higher boiling point solvents are desired, such as propylene carbonate, ethylene carbonate, 3-methyl-2-oxazolidone, tetraglyme and sulfolane. A plasticizing amount of the solvent is employed Mixtures of such solvents are suitable and, in some cases, desired because the individual solvents can provide a balance and diversity of properties to the mixture.

Although not preferred, an amount of the ionizable electrolyte salt can be used to affect the viscosity of or plasticize the cathode mixture, so long as the amount used is less than that needed to render the cathode ionically conductive.

After the cathode mixture is prepared, it is applied to an electrically conductive current collector. The current collector can be a metal foil, a metal screen, a metallic or carbon foam, or a metallic or carbon fiber mat so long as it is electrically conductive. Examples include foils of aluminum, nickel or copper, nickel foam, or nickel or carbon fiber mats. An example of a preferred carrier is a metallic foil, such as aluminum foil. The cathode mixture can be applied to the current collector by several different methods. Examples include roll coating, doctor blading, imbed-extrusion, and the like. After the cathode mixture is applied to the current collector, any solvent used to affect the viscosity is removed, and the prepolymer composition is polymerized, cured and/or crosslinked. The resultant article is a solid dry flexible ionically nonconductive polymer film with active cathode material dispersed throughout, which is adhered to an electrically conductive current collector. The thickness of the polymer film can vary, but typically ranges from about 2 to about 30, and preferably from about 3 to about 6 mils.

The active anode material can include active metals, such as zinc or aluminum; alkali metals and alkaline earth metals; and alkali metal intercalated carbon or graphites, such as lithium intercalated carbon or graphite, or composites thereof. Preferred active anode materials include alkali metals, especially lithium. Preferably, the anode is a foil of the metal. The anode can also be a composite of a foil of the metal laminated with a layer of a polymeric composition.

If after polymerization, cure or crosslinking the prepolymer composition in the cathode forms a continuous polymer film over the surface of the cathode with no active cathode material exposed on the surface, then this polymer film can be used as the separator between the cathode and the anode. However, to ensure proper separation, it may be desirable to employ another electrically insulating ion permeable separator between the cathode and the anode. This separator can be a microporous membrane or sheet, paper, plastic screen or it can be a polymer film. In the electrochemical cells of this invention, it is preferred to use a polymer film of the same or similar components to those that form the prepolymer composition in the cathode. The separator can be applied to either the cathode or the anode, so long as it is disposed between them in the completed electrode assembly. Preferably, if a polymer film is employed, it is applied to one or both surfaces of the anode. The polymer film can be sprayed, laminated, extruded or roll coated, to form a tough thin amorphous flexible film on the electrode. For lithium foil anodes, a film of polyethylene oxide can be used. Just as in the cathode prepolymer composition, it is preferred that the polymer film not contain any ionizable salt, so that the electrode assembly will not be electrochemically active when assembled.

The anode and separator are placed next to the cathode to form the completed electrode assembly. The separator is disposed between the cathode and the anode. The electrochemical cells of this invention can use any type of electrode assembly, such as a jelly roll, and flat single or flat stacked multicell assemblies. In the jelly roll assembly, the cathode, separator and anode are wound and then placed in the cell housing. Prior to placing the assembly in the housing, a continuity check can be made on the assembly to detect any shorts.

The cell housing is typically made of plastic or metal, such as stainless steel or nickel plated steel, metal coated plastic, plastic-metal laminate sheets, or impermeable inorganic-coated plastic, such as SiO or $SiO_x$-coated plastic.

After placing the electrode assembly in the housing, the cell is completed by adding an amount of an ionizable electrolyte salt to render the polymer film in the cathode and the separator between the cathode and the anode ionically conductive. Examples of suitable salts for nonaqueous cell systems include alkali metal salts that have the same cation as the anode metal, such as $LiCF_3SO_3$, $LiClO_4$, $LiBF_4$, $LiAsF_6$, $Li(CF_3SO_2)_2N$, and the like. For aqueous cell systems, $ZnCl_2$, $AlCl_3$, KOH, and the like are suitable salts. The amount of the salt employed will vary depending on the type of active cathode material, the type of active anode material, the type of polymer employed in the cell, and the intended use of the cell. Typically, the amount used will produce an effective electrolyte concentration in the range of from about 0.1M to about 10.0M, and preferably from about 0.5M to about 3.0M, and more preferably from about 1.0M to about 1.5M. Preferably, the salt is added as a solution of the salt in a solvent. For nonaqueous cells, suitable solvents for the salts include nonaqueous organic solvents such as dioxolane, dimethoxyethane, 3-methyl-2-oxazolidone, propylene carbonate, ethylene carbonate, triglyme, tetraglyme, sulfolane, 3,5-dimethylisoxazole, and the like. For aqueous cell systems, water can be used as the solvent.

The cell is sealed by using a cover with a sealing gasket. The cover, if metallic, can be in contact with one of the electrodes to provide a terminal for the cell and can contain a pressure relief vent. For flat cell construction, the housing can be sealed with metal or plastic sheets, or plastic-metal laminate sheets.

EXAMPLE

A test cell is made using two planar electrodes, one of lithium foil and the other of a mixture of 64.7% by volume of $FeS_2$, 5.3% by volume acetylene black, and 30% by volume of a prepolymer composition. The prepolymer composition is 48.8% by weight polyethylene glycol acrylate, 48.87% by weight polyethylene oxide of molecular weight 200, 2.4% by weight of polyethylene glycol diacrylate and 0.2% by weight of polymerization initiator, 2,2'-azobisisobutyronitrile. Both glycol acrylates contain 9 PEO units. An amount of trichloroethylene is added to the cathode mixture to lower the mix viscosity so that it can be roll coated onto a 1 mil thick aluminum foil carrier. After coating onto the carrier, the prepolymer in the cathode mixture is chemically polymerized and crosslinked in situ by heating to 80° C. The total thickness of the cathode is 5 mils. A layer of polyethylene oxide film is disposed between the lithium foil anode and the cathode mixture. The cell assembly is placed in a cell container, and an electrolyte solution of 1.5M $LiCF_3SO_3$ electrolyte salt in a solvent mixture of 50% by volume 1,3-dioxolane, 40% by volume dimethoxyethane, 10% by volume 3-methyl-2-oxazolidone and 0.2% by volume 3,5-dimethylisoxazole is added to complete the cell. Noticeable swelling of the cathode mixture is observed.

We claim:

1. An ionically nonconductive electrode for an electrochemical cell, employing a plasticizable polymeric electrolyte, said electrode comprising an active material of at least about 60% by volume of said electrode and said polymeric electrolyte characterized by being plasticized when an ionizable electrolyte salt solution is added to the cell.

2. The electrode of claim 1 wherein the electrode comprises a transition metal chalcogenide.

3. The electrode of claim 2 wherein said electrode is a cathode.

4. The electrode of claim 2, wherein said cathode comprises a material selected from the group consisting of $FeS_2$, $MnO_2$, $TiS_2$, $V_2O_5$, $V_6O_{13}$, and $WO_3$.

5. The electrode claim 1 wherein said electrode is an alkali metal or lithium intercalated carbon or graphite.

6. The electrochemical cell of claim 5 wherein said anode is lithium foil.

7. An ionically nonconductive electrode for an electrochemical cell comprising an active material dispersed in an ionically nonconductive prepolymeric composition to form the ionically nonconductive electrode, said active material being at least about 60% by volume of said electrode and said ionically nonconductive electrode having the capacity of becoming ionically conductive upon the addition thereto of an ionizable electrolyte salt after the electrode is placed in a housing.

8. The ionically nonconductive electrode for an electrochemical cell of claim 7 wherein said electrode is a cathode.

9. The electrode of claim 7 wherein said prepolymeric composition is selected from ethylenically unsaturated monomers, comonomers and oligomers; alkylene oxide monomers, comonomers and oligomers; acrylic acid-based monomers, comonomers and oligomers; or mixtures of such monomers, comonomers and oligomers.

10. The electrode of claim 9 wherein said prepolymeric composition is selected from the group consisting of polypropylene oxide, polyethylene oxide, polyethylene-polypropylene oxide, polyethylene glycol, polyethylene glycol acrylates, diacrylates and triacrylates, modified siloxanes, urethanes with polyethylene glycol side chains, epoxides and acrylated epoxies, and mixtures of such compounds.

11. The electrochemical cell of claim 7 wherein said prepolymeric composition is from about 10% to about 45% by volume of said electrode.

12. The electrochemical cell of claim 11 wherein said prepolymeric composition is from about 20% to about 35% by volume of said electrode.

13. An electrochemically inactive electrochemical cell precursor comprised of an electrode comprising at least 60% by volume of active material dispersed in an ionically nonconductive polymer film in contact with an electrically conductive current collector, a housing which contains said inactive precursor and whereby with the addition of an ionizable electrolyte salt in a solvent/plasticizer to said housing, said cell precursor becomes electrochemically active.

14. The electrochemically inactive electrochemical cell precursor of claim 13 wherein said electrode is a cathode.

15. An electrochemical cell comprised of:
   a) an electrode assembly comprising an anode and a cathode, at least one of said anode and said cathode comprising a major amount of at least 60% by volume active material dispersed in an ionically nonconductive polymer film in contact with an electrically conductive current collector;
   b) a housing which contains the electrode assembly; and
   c) an ionizable electrolyte salt in solvent/plasticizer to plasticize said polymer and cause said polymer and said cathode to swell, wherein said electrolyte salt is added to complete the cell after the electrode assembly has been placed in the housing.

16. The electrochemical cell of claim 15, wherein said at least one of said anode and said cathode comprising a major amount of at least 60% by volume active material is a cathode.

17. The cell of claim 15 including a current collector of metallic foil.

18. The electrochemical cell of claim 17 wherein said metallic foil is aluminum foil.

19. The cell of claim 15 wherein said cathode comprises $FeS_2$, said polymer film being prepared from a mixture comprising polyethylene glycol acrylate, polyethylene oxide and polyethylene glycol diacrylate, and said cell including a current collector of aluminum foil.

20. The electrochemical cell of claim 15 wherein said cathode comprises a transition metal chalcogenide.

21. The cell of claim 15 wherein said cathode comprises a material selected from the group consisting of $FeS_2$, $MnO_2$, $TiS_2$, $V_2O_5$, $V_6O_{13}$, and $WO_3$.

22. The cell of claim 15 wherein said polymer film is prepared from a prepolymeric composition selected from the group consisting of ethylenically unsaturated monomers, comonomers and oligomers; alkylene oxide monomers, comonomers and oligomers; acrylic acid-based monomers, comonomers and oligomers; and mixtures of such monomers, comonomers and oligomers.

23. The cell of claim 22 wherein said polymer film is prepared from a prepolymeric composition selected from the group consisting of polypropylene oxide, polyethylene oxide, polyethylene-polypropylene oxide, polyethylene glycol, polyethylene glycol acrylates, diacrylates and triacrylates, modified siloxanes, urethanes with polyethylene glycol side chains, epoxides and acrylated epoxies, or mixtures of such compounds.

24. The electrochemical cell of claim 15 wherein said ionizable electrolyte salt is an alkali metal salt.

25. The electrochemical cell of claim 24 wherein said ionizable electrolyte salt is added to the cell as a solution in a suitable solvent.

26. The electrochemical cell of claim 25 wherein said alkali metal salt is $LiCF_3SO_3$, and said solvent is comprised of dioxolane, propylene carbonate, and dimethoxyethane.

27. The electrochemical cell of claim 15 wherein said cathode comprises $FeS_2$, said polymer film is prepared from a mixture comprising polyethylene glycol acrylate, polyethylene oxide and polyethylene glycol diacrylate, said current collector is aluminum foil, said anode is lithium, including a polymer film separator of polyethylene oxide disposed between said anode and said cathode, and said ionizable electrolyte salt is a solution of 1.5M $LiCF_3SO_3$ in a solvent mixture comprising dioxolane, dimethoxyethane, 3-methyl-2-oxazolidone and 3,5-dimethylisoxazole.

28. A process for making an electrochemical cell that contains an anode, a cathode and a polymer electrolyte comprising:
   a) preparing at least one of said anode and said cathode by contacting a major amount of active material with a binding amount of an ionically nonconductive prepolymeric composition to form an ionically nonconductive electrode mixture;
   b) applying said electrode mixture to an electrically conductive carrier and polymerizing the prepolymeric composition to provide a polymer film having active material dispersed throughout;
   c) placing the other of said anode and said cathode near to the at least one of said cathode and said anode with an electrically insulating ion permeable material disposed between the cathode and anode to form an electrode assembly;
   d) placing the electrode assembly inside a housing for the cell; and
   e) then adding an amount of an ionizable electrolyte salt solution to provide ionic conductivity to the anode, to the cathode and to the polymer film between the cathode and anode to form an active electrochemical cell, said salt solution including solvent to cause said polymer film to swell.

29. The process for making the electrochemical cell of claim 28 wherein said at least one of said anode and cathode is a cathode.

30. A process for making an electrochemical cell that contains an anode, a cathode and a polymer electrolyte comprising:
   a) preparing at least one of said anode and said cathode by contacting a major amount of active material with a binding amount of an ionically nonconductive prepolymeric composition to form an ionically nonconductive electrode mixture;
   b) polymerizing the prepolymeric composition to provide a polymer film having active electrode material dispersed throughout;
   c) placing the other of said anode and said cathode near to the at least one of said cathode and said anode with an electrically insulating ion permeable material disposed between the cathode and the anode to form an electrode assembly;
   d) placing the electrode assembly inside a housing for the cell; and
   e) then adding an amount of an ionizable electrolyte salt solution to provide ionic conductivity to the anode, to the cathode and to the polymer film between the cathode and anode to form an active electrochemical cell, said salt solution including solvent to cause said polymer film to swell.

31. The process for making the electrochemical cell of claim 30 wherein at least one of said anode and said cathode is a cathode.

32. The process of claim 30 wherein the active cathode material is $FeS_2$ which is present in an amount of at least 50% by volume of said cathode; the prepolymeric composition comprises polyethylene oxide, polyethylene glycol acrylate, and polyethylene glycol diacrylate; a cathode current collector of aluminum foil is incorporated; the anode is lithium; the electrically insulative ion permeable material is a polymer film of polyethylene oxide; the electrode assembly is a jelly roll assembly; and the ionizable electrolyte salt solution is 1.5M $LiCF_3SO_3$ in a solvent comprising dioxolane, propylene carbonate, and dimethoxyethane.

33. The process of claim 30 wherein the prepolymeric composition is comprised of polyethylene oxide, polyethylene glycol acrylate, and polyethylene glycol diacrylate; and the electrically insulative ion permeable material is a polymer film of polyethylene oxide.

* * * * *